United States Patent
Hwang

(10) Patent No.: US 10,300,915 B2
(45) Date of Patent: May 28, 2019

(54) METHOD FOR CONTROLLING AUTOMATIC TRANSMISSION

(71) Applicant: Hyundai Motor Company, Seoul (KR)

(72) Inventor: Jin Young Hwang, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 273 days.

(21) Appl. No.: 15/380,633

(22) Filed: Dec. 15, 2016

(65) Prior Publication Data
US 2018/0105177 A1    Apr. 19, 2018

(30) Foreign Application Priority Data

Oct. 18, 2016 (KR) .................. 10-2016-0134979

(51) Int. Cl.
| | |
|---|---|
| *B60W 10/02* | (2006.01) |
| *B60W 30/18* | (2012.01) |
| *B60W 10/06* | (2006.01) |
| *B60W 10/11* | (2012.01) |
| *B60W 10/115* | (2012.01) |

(Continued)

(52) U.S. Cl.
CPC ...... *B60W 30/18036* (2013.01); *B60W 10/02* (2013.01); *B60W 10/06* (2013.01); *B60W 10/11* (2013.01); *B60W 10/115* (2013.01); *B60W 30/18054* (2013.01); *B60W 30/194* (2013.01); *F16H 61/0021* (2013.01); *F16H 61/04* (2013.01); *F16H 63/502* (2013.01); *B60W 2510/1005* (2013.01); *B60W 2510/107* (2013.01); *B60W 2510/1015* (2013.01); *B60W 2540/16* (2013.01); *B60W 2710/021* (2013.01); *B60W 2710/0644* (2013.01);

(Continued)

(58) Field of Classification Search
CPC ......... B60W 30/18036; B60W 30/194; B60W 30/18054; B60W 10/115; B60W 10/06; B60W 10/11; B60W 10/02; B60W 2710/1077; B60W 2510/1015; B60W 2540/16; B60W 2510/107; B60W 2710/021; B60W 2710/0644; B60W 2710/1083; B60W 2510/1005; F16H 61/0021; F16H 59/72
See application file for complete search history.

(56) References Cited

U.S. PATENT DOCUMENTS

| | | | |
|---|---|---|---|
| 7,104,907 B2 | 9/2006 | Jozaki et al. | |
| 8,473,139 B1 * | 6/2013 | Futamura | B60W 20/30 180/337 |

(Continued)

FOREIGN PATENT DOCUMENTS

| | | |
|---|---|---|
| JP | 3810024 B2 | 8/2006 |
| JP | 2008215451 A | 9/2008 |

(Continued)

*Primary Examiner* — David J Hlavka
(74) *Attorney, Agent, or Firm* — Slater Matsil, LLP

(57) ABSTRACT

A method for controlling an automatic transmission includes reducing, by a controller, a number of rotation of the engine connected to the automatic transmission to the first number of rotation when a shifting of the automatic transmission is started. The method further includes reducing, by the controller, a line pressure that is a hydraulic pressure of a flow line that operates the automatic transmission when the shifting of the automatic transmission is started.

20 Claims, 5 Drawing Sheets

(51) Int. Cl.
*B60W 30/194* (2012.01)
*F16H 61/00* (2006.01)
*F16H 61/04* (2006.01)
*F16H 63/50* (2006.01)
*F16H 59/72* (2006.01)

(52) U.S. Cl.
CPC .............. *B60W 2710/1077* (2013.01); *B60W 2710/1083* (2013.01); *F16H 59/72* (2013.01); *F16H 2061/0485* (2013.01)

(56) References Cited

U.S. PATENT DOCUMENTS

| | | | |
|---|---|---|---|
| 2009/0042691 A1* | 2/2009 | Matsubara | B60K 6/383 |
| | | | 477/80 |
| 2014/0309079 A1* | 10/2014 | Tabata | B60K 6/547 |
| | | | 477/5 |
| 2016/0003335 A1 | 1/2016 | Son et al. | |

FOREIGN PATENT DOCUMENTS

| KR | 1020040028510 A | 4/2004 |
|---|---|---|
| KR | 1020060003536 A | 11/2006 |
| KR | 1020130077148 A | 7/2013 |
| KR | 20160003495 A | 1/2016 |

\* cited by examiner

METHOD FOR CONTROLLING AUTOMATIC TRANSMISSION

CROSS-REFERENCE TO RELATED APPLICATIONS

This application claims priority to and the benefit of Korean Patent Application No. 10-2016-0134979 filed in the Korean Intellectual Property Office on Oct. 18, 2016, the entire contents of which are incorporated herein by reference.

This application is related to co-pending Korea Patent Publication No. 10-2016-0003495.

TECHNICAL FIELD

The present invention relates to an automatic transmission of a vehicle, and more particularly, to a method for controlling an automatic transmission.

BACKGROUND

In general, a vehicle equipped with an automatic transmission can automatically shift a transmission gear to a target gear shift stage by controlling a hydraulic pressure within a shift range set according to a driving speed of the vehicle and an opened amount of a throttle valve.

Therefore, in the vehicle equipped with the automatic transmission whose operation state is controlled according to the hydraulic pressure, it is not necessary to operate a clutch pedal for interrupting power from an engine in order to vary an operating state of the transmission gear. Thus, fatigue of a driver can be reduced, and the vehicle's engine does not stall during driving due to a false operation performed by the driver and driving inexperience. Therefore, even a beginner can easily perform a driving operation.

In the automatic transmission, a torque converter changes a rotational power of an engine, and a solenoid valve is controlled by a control signal applied from a transmission control unit (TCU) according to a driving state of the vehicle so that a hydraulic circuit which operates a friction element is formed. The hydraulic circuit executes an automatic gear shifting operation.

The automatic transmission outputs a control signal according to a position of a shift lever selected by the driver, the vehicle speed, and the opened amount of the throttle valve. The solenoid valve is driven by the output control signal so that port conversion of the valve in the hydraulic circuit is performed. Then, an operating state of the friction element for selecting one of gear shifting stages of a transmission gear mechanism is controlled by the hydraulic pressure supplied from an oil pump. An operating state of a planetary gear set is changed according to a selective operation of the friction element composed of a clutch and a brake so that the operating state of the planetary gear set is changed to an appropriate shift ratio. The appropriate shift ratio is transferred to a drive gear of a differential gear device.

The above information disclosed in this section is merely for enhancement of understanding of the background of the invention and therefore it may contain information that does not form the prior art that is already known in this country to a person of ordinary skill in the art.

SUMMARY

Embodiments of the present invention have been made in an effort to provide a method (or a shifting control logic) for controlling an automatic transmission that is capable of reducing a drag (or a resistance) so that an engine stalls at an initial gear shifting of the automatic transmission when a torque converter such as a torque converter of a separate chamber multi-plate clutch structure is applied to the automatic transmission of a vehicle.

An exemplary embodiment of the present invention may provide the method for controlling the automatic transmission, including: reducing, by a controller, a number of rotation of the engine connected to the automatic transmission to the first number of rotation when a shifting of the automatic transmission is started; and reducing, by the controller, a line pressure that is a hydraulic pressure of a flow line that operates the automatic transmission when the shifting of the automatic transmission is started.

The method for controlling the automatic transmission may further include: when the number of rotation of the engine is reduced to the first number of rotation, increasing, by the controller, a pressure of a fluid supplied to a reverse clutch that operates in response to a reverse (R) stage shifting signal and is included in the automatic transmission after the controller provides an initial filling hydraulic pressure to the reverse clutch.

The automatic transmission may perform a shifting that is moved from a parking (P) stage to a reverse (R) stage when the shifting of the automatic transmission is started.

The first number of rotation may a number of rotation that adjusts a number of rotation of a turbine which is included in a torque converter included in the automatic transmission to zero.

The method for controlling the automatic transmission may further include: increasing, by the controller, a pressure of a fluid supplied to the reverse clutch until the number of rotation of the turbine is adjusted to zero.

The method for controlling the automatic transmission may further include: after the number of rotation of the turbine is adjusted to zero, increasing, by the controller, the number of rotation of the engine to a second number of rotation for a reverse (R) stage control of the automatic transmission; after the number of rotation of the turbine is adjusted to zero, increasing, by the controller, the line pressure to a hydraulic pressure for the R stage control of the automatic transmission; and after the number of rotation of the turbine is adjusted to zero, increasing, by the controller, the pressure of the fluid supplied to the reverse clutch to a pressure for the R stage control of the automatic transmission.

A temperature of the automatic transmission may be low when the shifting of the automatic transmission is started.

The method for controlling the automatic transmission according to the exemplary embodiment of the present invention may control a number of rotation of the engine, a line pressure of the automatic transmission, and a reverse clutch to prevent starting of the engine from being turned off due to the torque converter when gear shifting of the automatic transmission starts at a temperature such as a cryogenic temperature (e.g. a temperature that is equal to or greater than −30° C. and is equal to or less than −10° C.).

BRIEF DESCRIPTION OF THE DRAWINGS

A brief description of the drawings will be provided to more sufficiently understand the drawings which are used in the detailed description of the present invention.

DETAILED DESCRIPTION OF ILLUSTRATIVE EMBODIMENTS

Figure 1:
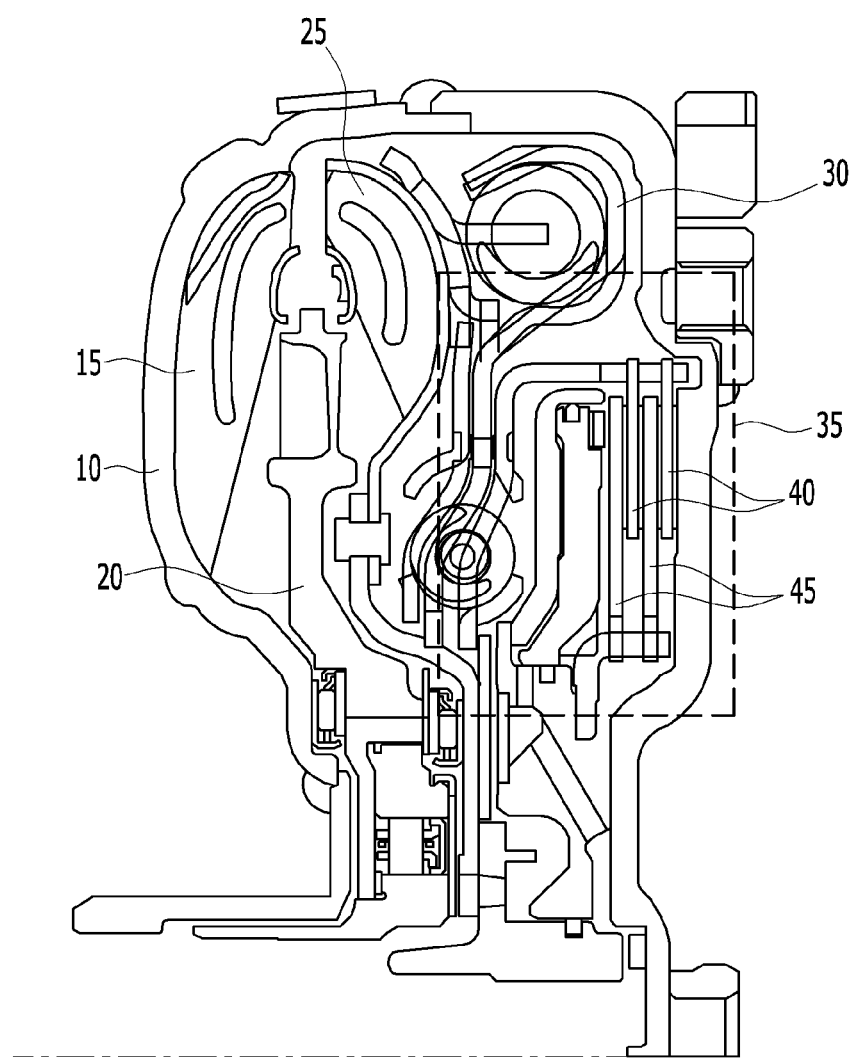
FIG. 1 is a half cross-sectional view showing a torque converter of a separate chamber multi-plate clutch structure in which an engine stall phenomenon occurs.

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing embodiments of the present invention, well-known configurations or functions will not be described in detail for clarity. Throughout the accompanying drawings, the same reference numerals will be used to denote the same components.

Terms used in the present specification are only used in order to describe specific exemplary embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Because of high oil prices and $CO_2$ emission regulations, fuel efficiency improvement and eco-friendliness have become key items for vehicle development. Car makers are concentrating on developing technologies for fuel reduction to achieve these goals. In order to improve fuel efficiency, use of a torque converter including a separate chamber multi-plate clutch structure (e.g., a 3-way separate chamber multi-plate clutch structure) having improved controllability has increased.

However, the torque converter of the separate chamber multi-plate clutch structure uses a multi-plate clutch and flow amount into the multi-plate clutch is small. Therefore, a drag torque in an initial gear shifting greatly increases at a cryogenic temperature where viscosity of transmission oil becomes extremely high. Because of this increase in the drag torque, a pump of the torque converter connected to an engine and a turbine of the torque converter are not smoothly disconnected during the initial gear shifting (e.g., a shifting that is changed to a reverse (R) stage from a parking (P) stage) and the turbine reduces revolutions per minute (RPM) of the engine so that the engine is off.

In more detail, when an automatic transmission including the torque converter is left at the cryogenic temperature for a long time, viscosity of the oil in the transmission becomes high and the oil becomes hard as a jelly state. In addition, in the separate chamber multi-plate clutch structure, a region that the oil adheres to is wide and the oil flow is not good compared with a torque converter that does not have the separate chamber multi-plate clutch structure so that a friction member (or a friction element) within the torque converter is not smoothly separated during the initial shifting. Thus, the engine can stop.

FIG. 1 is a half cross-sectional view showing the torque converter of the separate chamber multi-plate clutch structure in which an engine stall phenomenon occurs.

Referring to FIG. 1, the torque converter includes a front cover 10 which is an input side rotating member, a pump 15 including an impeller, a stator 20, a turbine 25 which is an output side rotating member, and a lock-up clutch (or damper clutch) 30. The torque converter may rotate the turbine 25 using a fluid.

The front cover 10 may be connected to a crankshaft of the engine to rotate together with the engine. The pump 15 may be connected to the front cover 10 to rotate together with the front cover.

The turbine 25 may be disposed so as to face the pump 15 and may drive an input shaft of an automatic transmission while rotating by a fluid supplied by the pump 15.

The stator 20 may be disposed so as to rotate in only one direction by a one way clutch between the pump 15 and the turbine 25, and may change a flow of a fluid (e.g., oil for the automatic transmission) coming out from the turbine to transfer the fluid to the pump. The stator 20 may have a same rotation center as that of the front cover 10.

The lock-up clutch 30, which is used as a device for directly connecting the engine and the automatic transmission, may be disposed between the front cover 10 and the turbine 25 to directly connect the front cover and the turbine.

A multi-plate clutch 40 and 45 and a separate chamber such as an engagement hydraulic pressure chamber to which a hydraulic pressure for engaging the lock-up clutch 30 is supplied may be included in a box indicated by reference numeral 35. In the separate chamber multi-plate clutch structure, the region that the oil adheres to is wide and the oil flow is not good so that the engine may stall when a gear shifting is started.

An example of the torque converter of the separate chamber multi-plate clutch structure is disclosed in Korea Patent Publication No. 10-2016-0003495.

Figure 2:
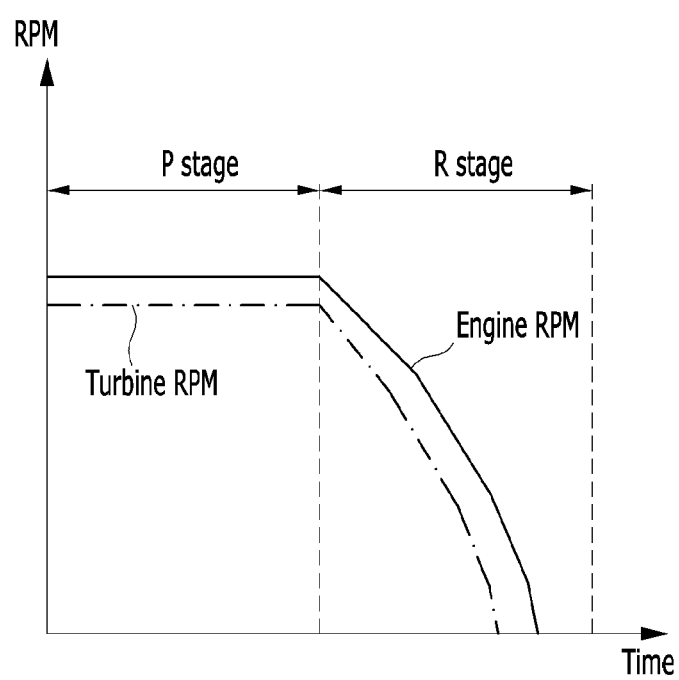
FIG. 2 is a graph for explaining the engine stall phenomenon in the torque converter of the separate chamber multi-plate clutch structure shown in FIG. 1.

FIG. 2 is a graph for explaining the engine stall phenomenon in the torque converter of the separate chamber multi-plate clutch structure shown in FIG. 1.

As shown in FIG. 2, when a gear shifting is moved from the P stage to the R stage for the first time, a drag within the torque converter may be excessive so that starting of the engine is turned off.

Figure 3:
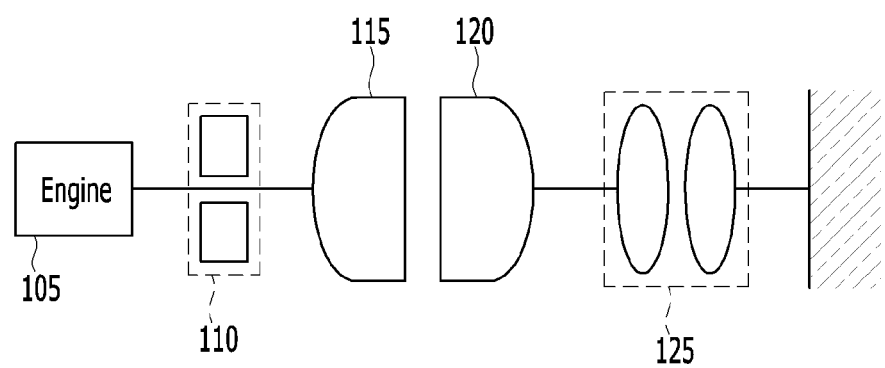
FIG. 3 is a view describing an automatic transmission to which a method for controlling the automatic transmission according to an exemplary embodiment of the present invention is applied.

FIG. 3 is a view describing an automatic transmission to which a method for controlling the automatic transmission according to an exemplary embodiment of the present invention is applied.

Referring to FIG. 3, the automatic transmission may include an oil pump no that can supply a fluid (e.g., oil) to a torque converter and a reverse clutch 125 and can be driven by rotation of an engine 105, a pump 115 that is included in the torque converter and is connected to the engine 105, a turbine 120 included in the turbine converter, and a reverse clutch 125 such as a 35R clutch operating in a third three stage, a fifth stage, and a reverse (R) stage. The reverse clutch 125 may be connected to a housing of the automatic transmission. The torque converter may be the torque converter of the separate chamber multi-plate clutch structure shown in FIG. 1. The automatic transmission may transmit power using the torque converter and may further include a planetary gear device (or a planetary gear set).

When the gear shifting of the automatic transmission is controlled (or shifted) to the R stage, a number of rotation (e.g., revolutions per minute (RPM)) of the engine 105 may be reduced so that the slip RPM (or a slip amount) of the torque converter is reduced. In more detail, when a static control shifting a parking (P) stage to the R stage is performed in the automatic transmission, the engine 105 may be reduced so that the slip RPM of the turbine 120 is lowered (or controlled) to 0 RPM. As a result, an instantaneous drag torque may be reduced so that startability of the engine 105 may be improved. In other words, when a shifting of the transmission starts at a cryogenic temperature, starting performance of the engine 105 connected to the transmission may be improved so that the engine stall is prevented.

In order to reduce load of the pump 115 connected to the engine 105, a line pressure supplied to a friction element (e.g., a clutch and a brake) that is included in the automatic transmission may be reduced. In more detail, a control in which that the line pressure of the automatic transmission is reduced may be performed in order to reduce load of the engine 105. A hydraulic pressure of the reverse clutch 125 may be controlled (or adjusted) after an RPM of the engine 105 is reduced.

Figure 4:
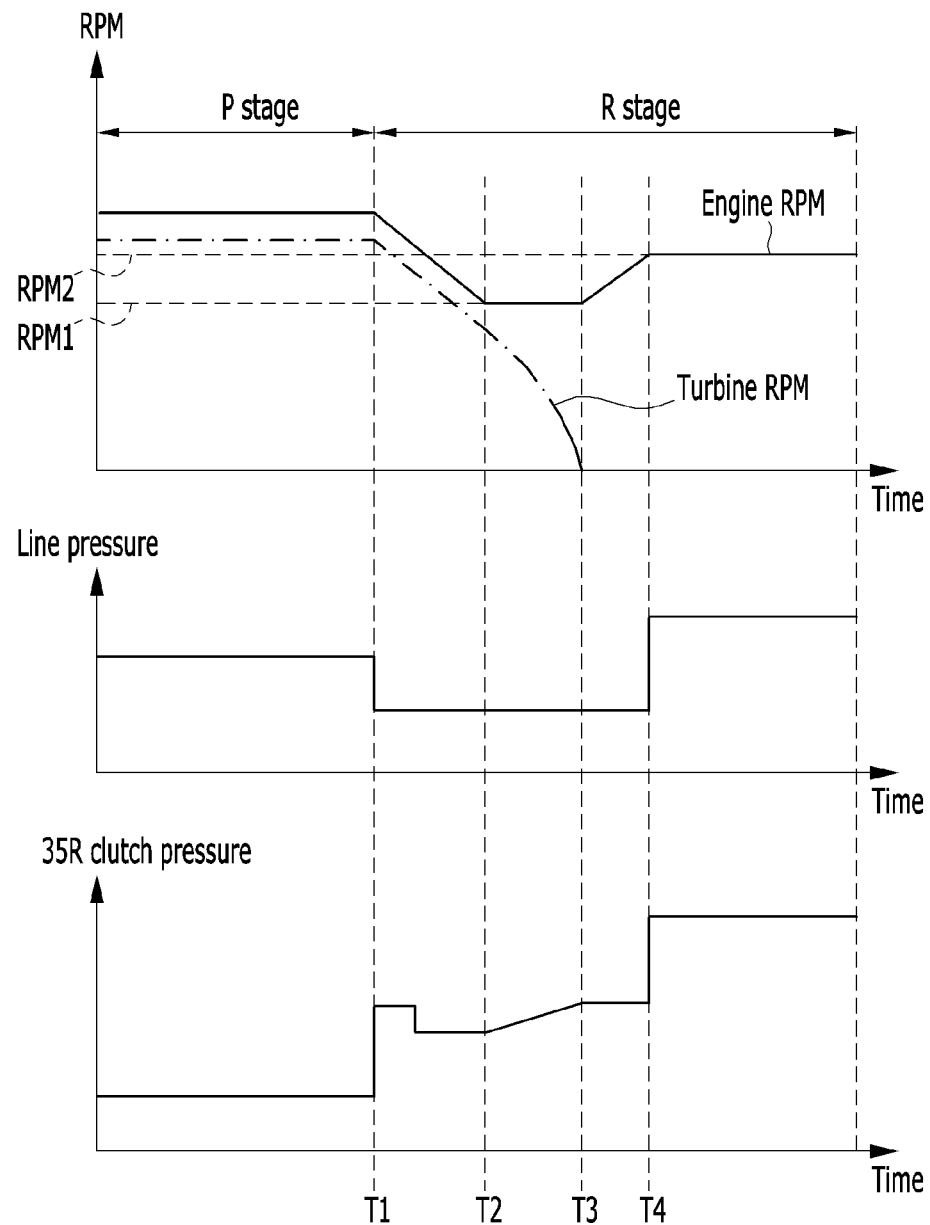
FIG. 4 is a timing diagram illustrating the method for controlling the automatic transmission according to the exemplary embodiment of the present invention.

FIG. 4 is a timing diagram illustrating the method for controlling the automatic transmission according to the exemplary embodiment of the present invention. The method for controlling the automatic transmission may be applied to the automatic transmission shown in FIG. 3.

Referring to FIG. 3 and FIG. 4, the RPM of the engine 105 may be reduced toward a first number of rotation (e.g., a first RPM) RPM1 at a first time T1 when an R stage shifting signal (or an R signal) is applied to the engine 105. The RPM of the engine 105 may become the first RPM (RPM1) at a second time T2. In more detail, the RPM of the engine 105 may be reduced in order to reduce the drag within the torque converter during the turbine control when the shifting in the automatic transmission is started for the first time.

The RPM of the turbine 120 may be zero due to the RPM of the engine 105 reduced to the first RPM (RPM1) at a third time T3.

The RPM of the engine 105 may be increased to a second number of rotation (e.g., a second RPM) RPM2 which is a target RPM at a fourth time T4 when a gear shifting stage of the automatic transmission is shifted from the P stage to the R stage. The second RPM (RPM 2) may be an RPM corresponding to the R stage.

When a shifting stage of the automatic transmission is shifted from the P stage to the R stage at the first time T1, the line pressure of the transmission (or the line pressure of a flow line included in the transmission) may be reduced in order to reduce a drag loss.

A clutch pressure, which is a pressure of a fluid supplied to the reverse clutch 125 at the first time T1, is increased to a pre-fill pressure which is an initial filling hydraulic pressure, and may be maintained for a certain time (or a predetermined time). A flow line connected to the reverse clutch 125 may be included in the flow line of the transmission.

A hydraulic control for the reverse clutch 125 may be started after the RPM of the engine 105 is reduced to the first RPM (RPM 1) at the second time T2.

Figure 5:
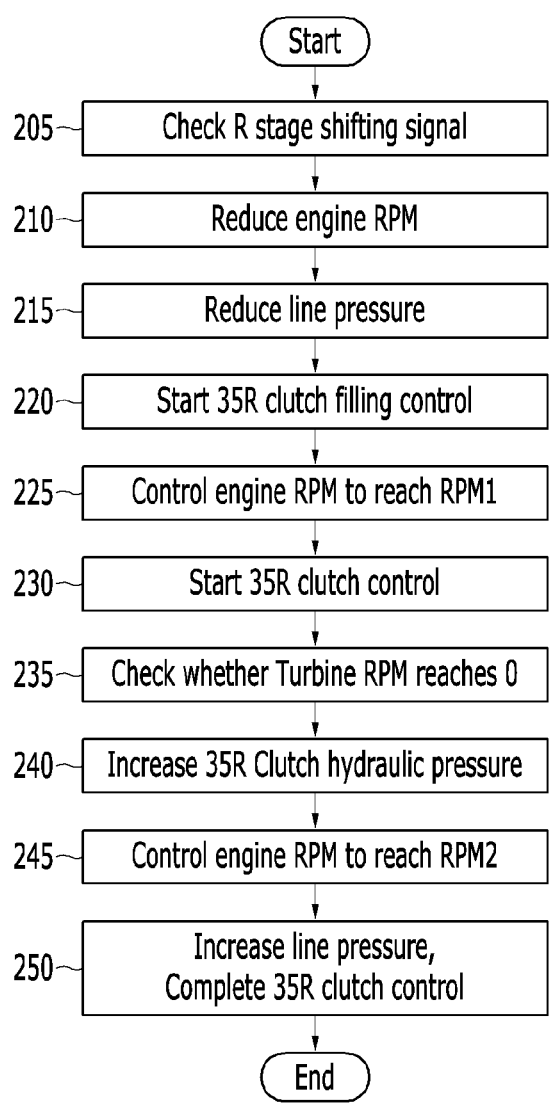
FIG. 5 is a flowchart illustrating the method of controlling the automatic transmission according to an exemplary embodiment of the present invention.

FIG. 5 is a flowchart illustrating the method of controlling the automatic transmission according to an exemplary embodiment of the present invention. The method of controlling the automatic transmission may be applied to the automatic transmission shown in FIG. 3.

Referring to FIG. 3, FIG. 4, and FIG. 5, in a checking step 205, a controller may receive the R stage shifting signal from an inhibitor switch of a vehicle including the automatic transmission. For example, the R stage shifting signal may be generated by a position of a shift lever selected by a driver of the vehicle.

For example, the controller may be one or more microprocessors operated by a program or hardware including the microprocessor. The program may include a series of commands for executing the method of controlling the automatic transmission according to an exemplary embodiment of the present invention. The controller may control an entire operation of the vehicle including the engine 105 and the automatic transmission.

According to a start step 210, when the shifting of the automatic transmission is started, the controller may control the engine 105 so that the number of rotation of the engine is reduced. When the shifting of the automatic transmission starts, the automatic transmission may perform the shifting that is moved from the P stage to the R stage. When the shifting of the automatic transmission is started, a temperature of the automatic transmission may be low. For example, the temperature of the automatic transmission is equal to or greater than −30° C. and is equal to or less than −10° C.

According to a change step 215, when the shifting of the automatic transmission is started, the controller may reduce the line pressure, which is a hydraulic pressure of a flow line that operates the automatic transmission including the torque converter.

According to a start step 220, the controller may control the reverse clutch 125 to perform an initial filling control in which a fluid (e.g., an automatic transmission fluid) is filled in an empty hydraulic system (or a hydraulic circuit) of the reverse clutch that operates in response to the R stage shifting signal.

According to a control step 225, when the shifting of the automatic transmission is started, the controller may control the engine 105 such that the number of rotation of the engine is reduced to the first number of rotation (RPM1).

According to a start step 230, when the number of rotation of the engine 105 is reduced to the first number of rotation, the controller may increase a pressure of a fluid supplied to the reverse clutch 125 after the controller provides an initial filling hydraulic pressure to the reverse clutch based on the initial filling control. In more detail, the controller may perform (or start) a hydraulic pressure control for the reverse clutch 125.

According to a checking step 235, the controller may check whether a number of rotation (e.g., an RPM) of the turbine 120 reaches zero due to the first number of rotation (RPM1).

According to a completion step 240, the controller may increase a pressure of the fluid supplied to the reverse clutch 125 until the number of rotation of the turbine 120 is adjusted to zero.

According to a control step 245, after the number of rotation of the turbine 120 is adjusted to zero, the controller may increase the number of rotation of the engine 105 to the second number of rotation (RPM2) for an R stage control of the automatic transmission.

According to a completion step 250, after the number of rotation of the turbine 120 is adjusted to zero, the controller may increase the line pressure to a hydraulic pressure for the R stage control of the automatic transmission, and may increase the pressure of the fluid supplied to the reverse clutch 125 to a pressure for the R stage control of the automatic transmission.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for controlling an automatic transmission, the method comprising:
   reducing, by a controller, a number of rotation of an engine connected to the automatic transmission to a first number of rotation when a shifting of the automatic transmission is started;
   reducing, by the controller, a line pressure that is a hydraulic pressure of a flow line that operates the automatic transmission when the shifting of the automatic transmission is started; and
   when the number of rotation of the engine is reduced to the first number of rotation, increasing, by the controller, a pressure of a fluid supplied to a reverse clutch after the controller provides an initial filling hydraulic pressure to the reverse clutch, wherein the reverse clutch operates in response to a reverse (R) stage shifting signal and is included in the automatic transmission.

2. The method of claim 1, further comprising performing a shifting from a parking (P) stage to the reverse (R) stage when the shifting of the automatic transmission is started.

3. The method of claim 1, wherein a temperature of the automatic transmission is low when the shifting of the automatic transmission is started.

4. The method of claim 1, wherein a temperature of the automatic transmission is equal to or greater than −30° C. and is equal to or less than −10° C. when the shifting of the automatic transmission is started.

5. The method of claim 1, wherein the first number of rotation is a number of rotation that adjusts a number of rotation of a turbine to zero, wherein the turbine is included in a torque converter included in the automatic transmission.

6. The method of claim 5, further comprising:
   increasing, by the controller, a pressure of a fluid supplied to the reverse clutch until the number of rotation of the turbine is adjusted to zero.

7. The method of claim 6, further comprising:
   after the number of rotation of the turbine is adjusted to zero, increasing, by the controller, the number of rotation of the engine to a second number of rotation for a reverse (R) stage control of the automatic transmission;
   after the number of rotation of the turbine is adjusted to zero, increasing, by the controller, the line pressure to a hydraulic pressure for the R stage control of the automatic transmission; and
   after the number of rotation of the turbine is adjusted to zero, increasing, by the controller, the pressure of the fluid supplied to the reverse clutch to a pressure for the R stage control of the automatic transmission.

8. A method for controlling an automatic transmission, the method comprising:
   reducing, by a controller, a number of rotation of an engine connected to the automatic transmission to a first number of rotation when a shifting of the automatic transmission is started;
   reducing, by the controller, a hydraulic pressure of a flow line that operates the automatic transmission when the shifting of the automatic transmission is started; and
   providing an initial filling hydraulic pressure to a reverse clutch, wherein the reverse clutch operates in response to a reverse (R) stage shifting signal and is included in the automatic transmission.

9. The method of claim 8, further comprising performing a shifting from a parking (P) stage to the reverse (R) stage when the shifting of the automatic transmission is started.

10. The method of claim 8, wherein the shifting of the automatic transmission is started when a temperature of the automatic transmission is at a cryogenic temperature.

11. The method of claim 8, wherein the shifting of the automatic transmission is started when a temperature of the automatic transmission is equal to or greater than −30° C. and is equal to or less than −10° C.

12. The method of claim 8, further comprising:
   when the number of rotation of the engine is reduced to the first number of rotation, increasing, by the controller, a pressure of a fluid supplied to the reverse clutch after the controller provides an initial filling hydraulic pressure to the reverse clutch.

13. The method of claim 8, wherein the number of rotation of a turbine is adjusted to zero when the number of rotation is reduced to the first number of rotation, wherein the turbine is included in a torque converter included in the automatic transmission.

14. The method of claim 8, further comprising:
   increasing, by the controller, a pressure of a fluid supplied to the reverse clutch until the number of rotation of a turbine is adjusted to zero.

15. The method of claim 14, further comprising:
   after the number of rotation of the turbine is adjusted to zero, increasing, by the controller, the number of rotation of the engine to a second number of rotation for the reverse (R) stage control of the automatic transmission.

16. The method of claim 14, further comprising:
after the number of rotation of the turbine is adjusted to zero, increasing, by the controller, the line pressure to a hydraulic pressure for the R stage control of the automatic transmission.

17. The method of claim 14, further comprising:
after the number of rotation of the turbine is adjusted to zero, increasing, by the controller, the pressure of the fluid supplied to the reverse clutch to a pressure for the R stage control of the automatic transmission.

18. A method for controlling an automatic transmission, the method comprising:
reducing, by a controller, a number of rotation of an engine connected to the automatic transmission to a first number of rotation when a shifting of the automatic transmission is started;
reducing, by the controller, a hydraulic pressure of a flow line that operates the automatic transmission when the shifting of the automatic transmission is started; and
increasing, by the controller, a pressure of a fluid supplied to a reverse clutch until the number of rotation of a turbine is adjusted to zero.

19. The method of claim 18, further comprising:
after the number of rotation of the turbine is adjusted to zero, increasing, by the controller, the number of rotation of the engine to a second number of rotation for a reverse (R) stage control of the automatic transmission.

20. The method of claim 18, further comprising:
after the number of rotation of the turbine is adjusted to zero, increasing, by the controller, the line pressure to a hydraulic pressure for the R stage control of the automatic transmission.

* * * * *